United States Patent [19]
Nikhil et al.

[11] Patent Number: 5,353,418
[45] Date of Patent: Oct. 4, 1994

[54] SYSTEM STORING THREAD DESCRIPTOR IDENTIFYING ONE OF PLURAL THREADS OF COMPUTATION IN STORAGE ONLY WHEN ALL DATA FOR OPERATING ON THREAD IS READY AND INDEPENDENTLY OF RESULTANT IMPERATIVE PROCESSING OF THREAD

[75] Inventors: Rishiyur S. Nikhil; Arvind, both of Arlington, Mass.

[73] Assignee: Massachusetts Institute of Technology, Cambridge, Mass.

[21] Appl. No.: 527,122

[22] Filed: May 21, 1990

Related U.S. Application Data

[63] Continuation-in-part of Ser. No. 358,937, May 26, 1989, abandoned.

[51] Int. Cl.$^5$ .............................................. G06F 9/30
[52] U.S. Cl. ................................... 395/375; 364/230; 364/262.4; 364/262.9; 364/263; 364/263.1; 364/241.8; 364/DIG. 1
[58] Field of Search .................. 395/375, 425, 800

[56] References Cited

U.S. PATENT DOCUMENTS

| | | | |
|---|---|---|---|
| 4,229,790 | 10/1980 | Gilliland et al. | 364/200 |
| 4,481,573 | 11/1984 | Fukunaga et al. | 395/400 |
| 4,819,155 | 4/1989 | Wulf et al. | 395/375 |
| 4,858,105 | 8/1989 | Kuriyama et al. | 395/375 |
| 4,943,908 | 7/1990 | Emma et al. | 395/375 |
| 5,050,068 | 9/1991 | Dollas et al. | 395/375 |
| 5,050,070 | 9/1991 | Chastain et al. | 395/375 |
| 5,226,131 | 7/1993 | Graff et al. | 395/375 |
| 5,241,635 | 8/1993 | Papadopoulos et al. | 395/375 |

OTHER PUBLICATIONS

J. S. Kowalik, *Parallel MIMD Computation: The HEP Supercomputer and its Applications*, MIT Press, pp. 4–9, 1985.

Robert A. Iannucci, *Toward A Dataflow/Von Neumann Hybrid Architecture*, Conference Proceedings of 15th Annual International Symposium on Computer Architecture, May 30–Jun. 2, 1988, Honolulu, Hawaii, IEEE, pp. 131–140.

Richard Buehrer et al., *Incorporating Data Flow Ideas into von Neumann Processors for Parallel Execution*, IEEE Transactions on Computers, vol. C-36, No. 12, Dec. 1987, IEEE pp. 1515–1522.

Bruno R. Preiss et al., *Semi-Statis Dataflow*, Proceedings of the 1988 International Conference on parallel Processing, Aug. 15–19, 1988, vol. II software, Pennsylvania State University Press, pp. 127–134.

Rishiyur S. Nikhil et al., *Can dataflow subsume von Neumann computing?*, Computer Architecture Conference Proceedings, vol. 17, No. 3, Jun. 1989, Washington, pp. 262–272.

R. H. Halstead, Jr. et al., *M.A.S.A.: A Multithreaded Processor Architecture for Parallel Symbolic Computing*, Conference Proceedings of the 15th Annual International Symposium on Computer Architecture, May 30–Jun. 2, 1988, Honolulu, Hawaii, IEEE, pp. 443–451.

*Primary Examiner*—Thomas C. Lee
*Assistant Examiner*—Paul Harrity
*Attorney, Agent, or Firm*—Hamilton, Brook, Smith & Reynolds

[57] ABSTRACT

A multithreaded parallel data processing system has at least one processing element for processing multiple threads of computation. Threads are described by thread descriptors which are stored while waiting to be processed in a thread descriptor storage. Thread descriptors are comprised of an instruction pointer and a frame pointer. The instruction pointer points to the next instruction to be executed, and the frame pointer points to a frame of memory locations that the next instruction will operate on. Included within the instruction on set of the at least one processing element is a load instruction that loads global data into local processing element memory that is performed to two phases: a request phase and a response phase. Also included are instructions to fork a thread into two threads and to join two threads into a single thread.

19 Claims, 6 Drawing Sheets

SYSTEM STORING THREAD DESCRIPTOR IDENTIFYING ONE OF PLURAL THREADS OF COMPUTATION IN STORAGE ONLY WHEN ALL DATA FOR OPERATING ON THREAD IS READY AND INDEPENDENTLY OF RESULTANT IMPERATIVE PROCESSING OF THREAD

GOVERNMENT SUPPORT

The United Stated government has rights in this invention pursuant to grant number N0014-84-K-0099 awarded by the Department of the Navy.

RELATED APPLICATION

This application is a continuation-in-part of co-pending U.S. application Serial No. 07/358,937, filed May 26, 1989, now abandoned.

BACKGROUND OF THE INVENTION

In the traditional von Neumann model of computing, instructions are executed one at a time in sequence. A central feature of this model is the instruction pointer. It points to the instruction that is currently executing. Each instruction has a unique successor which is usually at the following address that immediately follows the current instruction pointer address. To execute the next instruction in a sequence, the instruction pointer is usually incremented. Execution of that next instruction is then imperative. The sequence of instructions executed in a program is often referred to as a thread of computation.

Parallel processing machines are not limited to performing one thread at a time. They perform a number of threads simultaneously. They achieve this because they comprise multiple sequential von Neumann machines, each of which performs a single thread of computation.

SUMMARY OF THE INVENTION

In accordance with one aspect of the present invention, at least one data processing element is included in a data processing system. Multiple processing elements are preferred to provide added parallel processing capability. Each data processing element is itself capable of processing individual imperative control flow instructions in performing plural threads of computation. Successive instructions executed by a data processing element may be from different threads of computation. Each data processing element is preferably pipelined for high processing speed. These processing elements are preferably reduced instruction set processing elements so as to provide for easy implementation and high processing speed.

Each processing element includes a thread descriptor storage such as a FIFO queue for storing thread descriptors. Each thread descriptor (also referred to as a token or a continuation) identifies the next instruction to be processed in a particular thread by noting an instruction pointer value. It also identifies a frame of storage locations on which the next instruction acts. This frame is indicated by a frame pointer value that points to the beginning of the frame. Multiple thread descriptors may refer to the same frame.

The data processing system responds to load instructions to retrieve data from global memory by generating a request message. The load instructions are executed regardless of the current state of the global memory location. This request message includes a thread descriptor that need not be retained by the processing element. The request message is sent to a memory controller that generates a response message. The response message includes the data requested and a thread descriptor. The thread descriptor is stored in the thread descriptor storage for further processing. The response messages for multiple load requests may be returned to the processor in an order different from the order in which the corresponding requests are issued, and multiple requests may be issued before a response is received.

One of the instructions of the at least one processing element is preferably the fork instruction. The fork instruction produces two thread descriptors from a single thread of computation.

A joining instruction is provided to generate a single thread descriptor from two threads so as to join two threads into a single thread. The joining instruction specifies a memory location. The first of the two threads that reaches the join instruction marks the specified location full and stops computing. The other thread marks that location empty when it encounters a join instruction and continues computation.

In accordance with another aspect of the invention, a working memory is provided. This working memory is preferably a cache. It is comprised of storage locations upon which the at least one processing element operates. Frames of storage held in local memory are transferred to the working memory so as to be processed. The size of the frames of storage is not fixed a priori.

When the processing elements are pipelined, a clocking means is preferably included to clock thread descriptors out of the thread descriptor storage into the pipeline. The clock may also be used to clock successive stages of the pipeline such that each stage of the pipeline may operate on a separate thread of computation.

DETAILED DESCRIPTION OF THE PREFERRED EMBODIMENT

Figure 1:
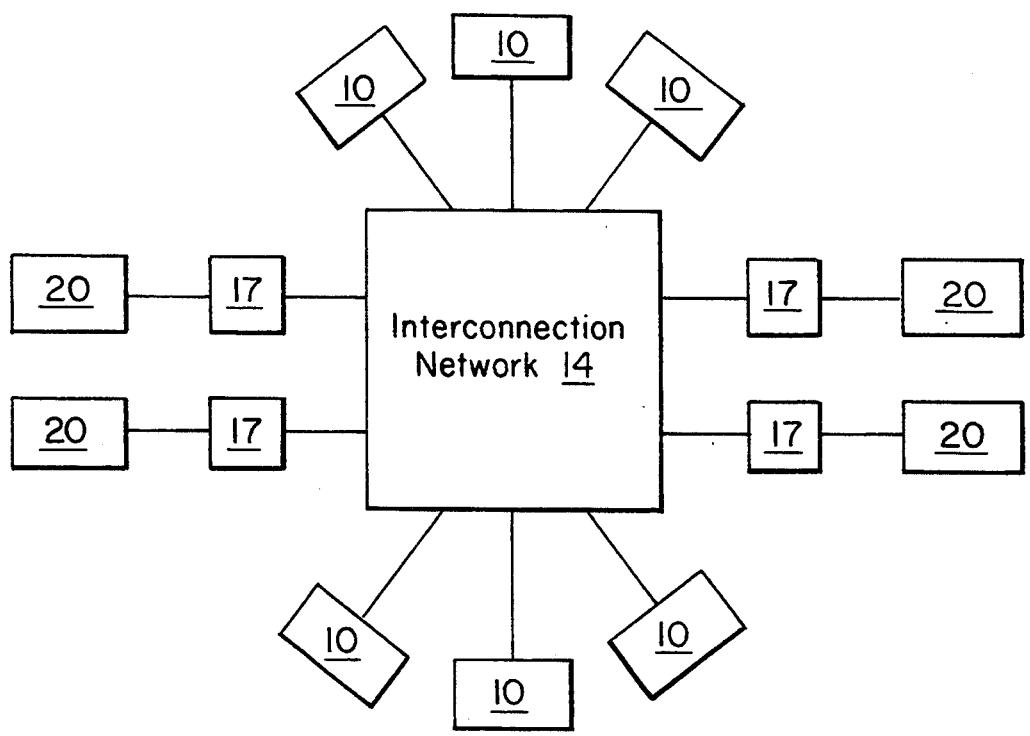
FIG. 1 illustrates the general structure of the data processing system of the present invention.

The preferred embodiment of the present invention concerns a multithreaded data processing system. This data processing system can operate on plurality of threads independently. The basic structure of this system is shown in FIG. 1. As can be seen in that figure, the system employs a plurality of processing elements 10. As will be described in more detail below, each processing element acts in parallel with the other processing elements 10. Global heap memory elements 20 are provided as a global memory space. The numerous processing elements and heap memory elements are connected via an innerconnection network 14. The interconnection network 14 routes messages amongst processing elements 10 and heap memory elements 20. A memory controller 17 is provided for controlling access to each heap memory element.

The processing elements 10 are preferably reduced instruction set (RISC) processors. The use of RISC processors allows for quick operation, as well as for a simplified hardware architecture. The reduced instruction set of the present invention, however, is not that which is typically found in RISC processors, rather it is an extended set of instructions comprised of the traditional set of instructions plus additional more powerful instructions. The additional instructions comprise the fork, join and start instructions discussed below. Further, the load instruction is different from traditional reduced instruction sets.

Figure 2:
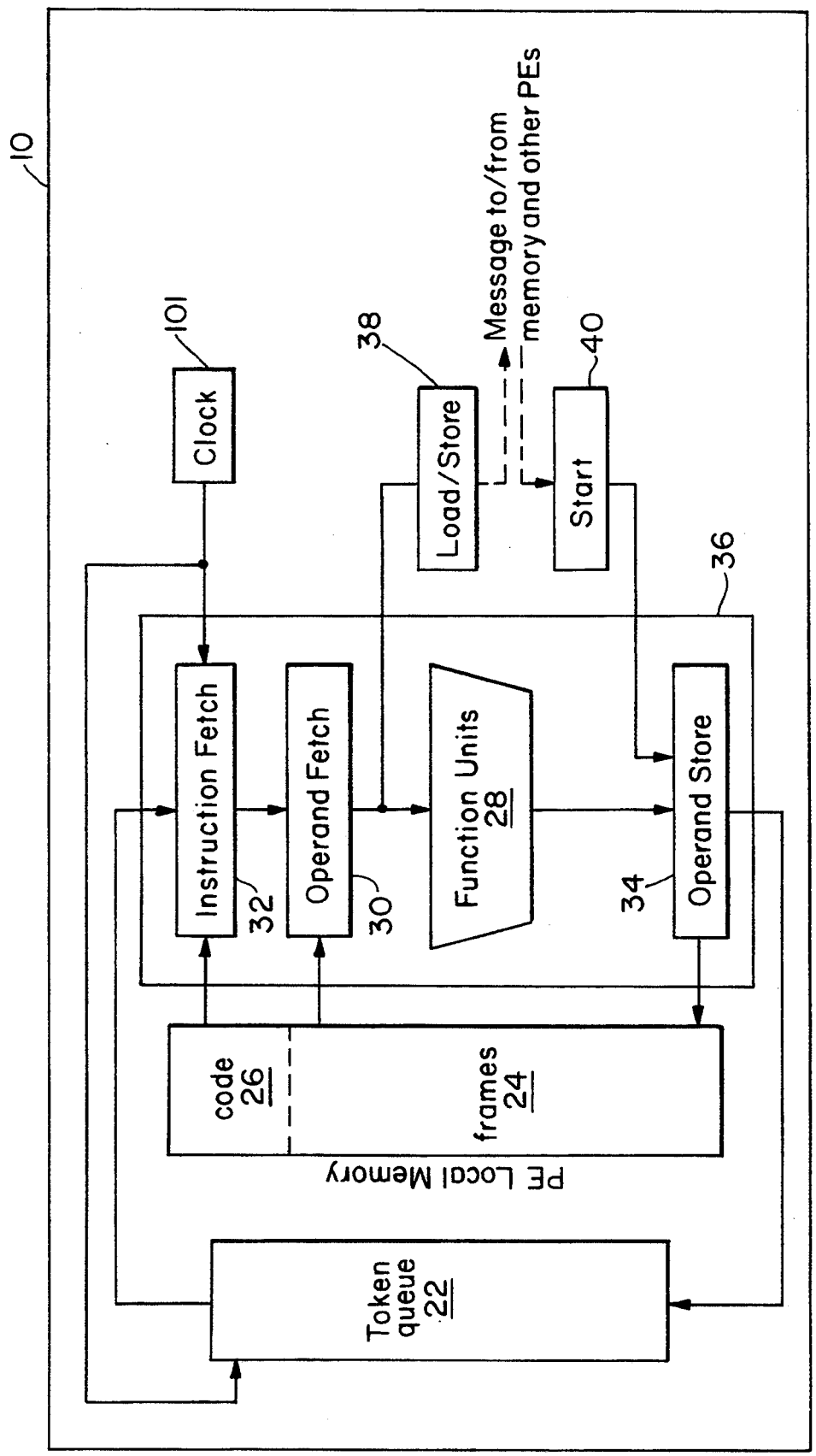
FIG. 2 illustrates the organization of a processing element.

FIG. 2 shows the basic structure of a processing element 10. Each processing element 10 is capable of processing a plurality of threads of computation independently. It is able to achieve this independence by using a pipelining structure 36. The pipeline 36 is comprised of four stages. The first stage is an instruction fetch stage 32. As its name implies, the basic task of this stage is to retrieve instructions from code section 26 held in local processing element memory.

The operand fetch stage 30 is the second stage of this pipeline 36. It fetches operands that are necessary to perform the fetched instruction. To fetch these operands, it is necessary for the operand fetch stage 30 to access frames of memory locations 24 where the operands are found. If the fetched instruction is a load, store or start instruction, the fetched instruction is processed specially at 38. Load, store and start instructions will be discussed in more detail below.

Frames 24 serve the role formerly served by register sets in early architectures. Specifically, operands are stored in the frames of storage 24 for ready access. The frames 24, however, are superior to registers because they are not limited to a fixed size. The size of a frame can be adapted to fit the needs of the threads that access it. Further, employing a frame pointer to specify the frame location provides the potential for allocation of a seemingly limitless number of frames having varying sizes. Hence, the number and sizes of frames available is not limited by the number of register sets.

Figure 3:
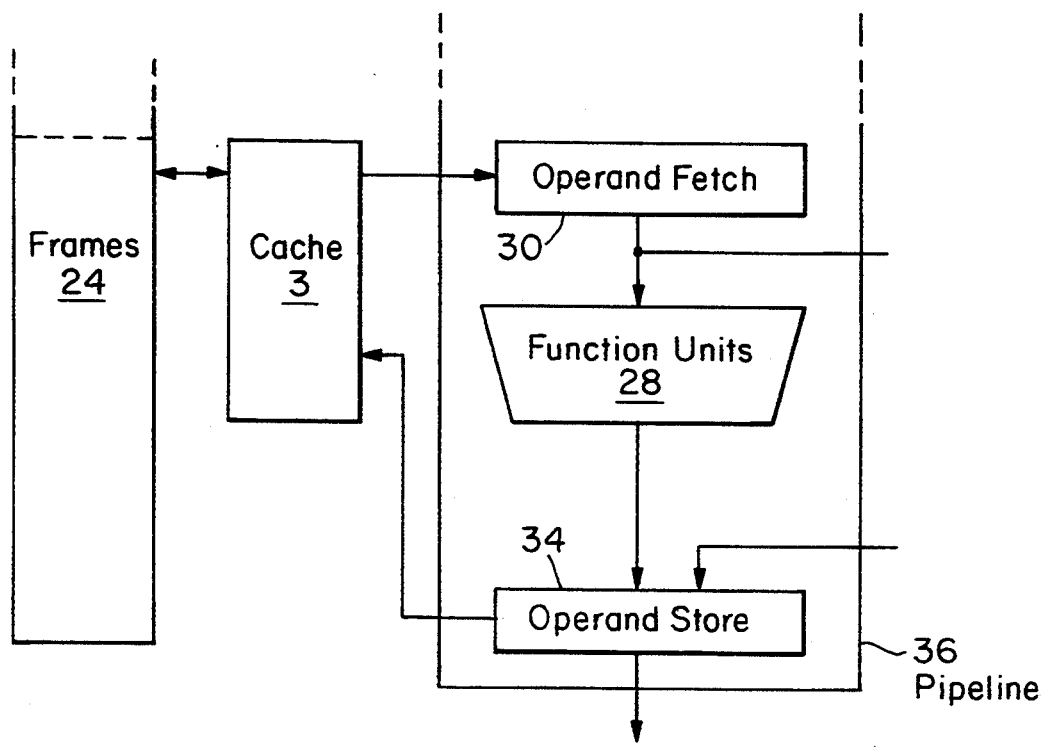
FIG. 3 illustrates the frames held in local memory and the cache for said frames.

The total frame memory 24 is likely too large to provide for sufficiently rapid memory access; thus, it is desirable to employ a cache 3 such as shown in FIG. 3. The size of the cache 3 may vary but should hold at least a couple of frames. Frames can be loaded into the cache 3 when needed. The cache 3 should be situated as shown in FIG. 3 between local frame storage 24 and the pipeline 36.

If the instruction is neither a load, store nor start instruction, then the processing of the particular instruction continues in the third stage of the pipeline, the function units stage 28. This stage represents the traditional arithmetic and logical unit (ALU) of a conventional processor. Once the desired functions have been performed in the functions unit stage 28, the processing of the instruction passes to the fourth stage of the pipeline 36, the operand store stage 34. This stage stores in the frames 24 the results of computations performed by the function units 28 when instructed by the fetched instruction.

Each processing element 10 also includes a token queue 22. The token queue 22 stores thread descriptors (also known as tokens) for threads of computation to be performed by the processing element 10. When thread descriptors held in the token queue 22 are placed into the processing pipeline 36, the next instruction in the thread of computation is performed. Hence, the processing elements 10 of the preferred embodiment of the present invention operate by feeding thread descriptors into the pipeline 36 every clock cycle. Clock cycles are generated by a processing element clock 101. Independence in processing of threads is achieved by having different threads of computation being placed into the pipeline 36 on successive clock cycles.

The thread descriptors held in the token queue 22 and processed by the pipeline 36 uniquely identify each thread of computation. They are referred to as tokens or continuations. Each token is comprised of two pointers: an instruction pointer (42B in FIG. 4) and a frame pointer 42A. The instruction pointer 42B points to a particular instruction held in the code section 26 of the local memory of the processing element. The frame pointer 42A, on the other hand, points to the beginning of a particular frame of memory locations in the frames section 24 of a processor element local memory.

Figure 4:
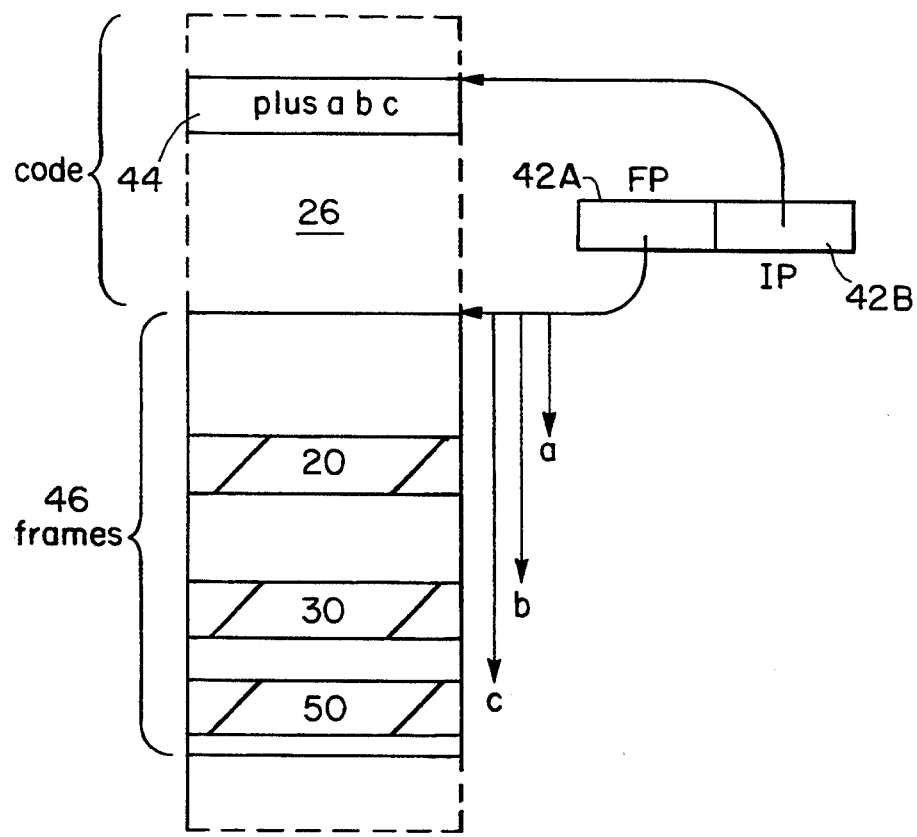
FIG. 4 illustrates how token descriptors are used in instruction execution.

FIG. 4 shows how the tokens are used by the processing pipeline 36. When the token 42 enters the pipeline 36, its instruction pointer 42B is used to locate a particular instruction 44 held in the code section 26 of local memory. This is performed in the previously described instruction fetch stage 32 of the processing pipeline 36. The fetched instruction is subsequently executed by the pipeline 36 as will be described below. As such, the data processing system of the present invention operates on an imperative set of instructions. In other words, whether an instruction executes is determined solely by whether the instruction pointer 42B points to it. There is no state of an operand which controls execution, only a value which is operated upon.

Another way of characterizing this aspect of the present invention is to classify the present invention as a control flow system as opposed to a data flow system. The control mechanism, not the data, dicates whether execution of an instruction takes place. The present system, thus, may be contrasted with data flow systems wherein the state of the data and the validity of the data is typically taken into account. The execution of instructions in the present system is dictated by the value of the instruction pointer. Once an instruction is fetched, execution is imperative.

Having already located the instruction, the processing pipeline 36 next seeks to obtain the appropriate operands for that instruction. To locate the operands, the frame pointer 42A of the token 42 is used to locate a particular frame 46 held in the frames portion 24 of local memory. As noted above, the frame pointer 42A points to the beginning of the specified frame 46. The addresses held in the operand field of the fetched instruction 44 are used as offsets to locate the memory locations where the desired operands are held.

For example, for the addition instruction 44 shown in FIG. 4, the a and b fields of that instruction 44 are used as offsets to locate the two operands that are to be added. The first operand is held at an address equal to the address at the beginning of the specified frame 46 plus a. The second operand to be added is, likewise, located in the same manner. It is located at the beginning address of the specified frame 46 plus an offset b.

The processing pipeline 36 next performs the desired function specified by the instruction 44. In the example case, the two operands are added. The addition specified by the instruction of the example case takes place in the third stage of the pipeline 36, the function units stage 28. Thus, in the example illustrated in FIG. 4 the function unit stage 28 adds 20 and 30. The resulting sum (i.e. 50) then, must be stored in the appropriate frame memory location. The operand store stage 34 of the pipeline 36 performs this storage. It locates the appropriate memory location by first using the frame pointer 42A to point to the beginning of the specified frame 46 and then adding the offset indicated by the instruction. In the example of FIG. 4, the value of "50" is stored at location c from the beginning of the specified frame 46. After the operand is stored, a new continuation for the same thread is placed in the token queue 22. This continuation is comprised of the current instruction pointer plus 1 (IP+1) and the current frame pointer (FP).

As already discussed, it is preferable for the processing elements 10 to execute a reduced instruction set. This reduced instruction set includes typical arithmetic and logic operations, such as, addition, subtraction, multiplication, etc. In this preferred implementation, all arithmetic logical operations are three address operations. In other words, the operands specify three addresses. The plus instruction, used as an example in FIG. 4. falls within this class of instructions. The three addresses specified by that instruction are the addresses of the two operands to be added and the address where the sum of these operands is to be stored. Similarly, an instruction such as "compare s1 s2 d" compares the values at the addresses specified by the frame pointer plus s1 and the frame pointer plus s2. It then stores a condition code at the address specified by the frame pointer plus d.

Conventional control instructions such as jump and conditional jump instructions are also included within the reduced instruction set of the processing elements. Control instructions control the order and flow of program execution. For a jump instruction. the continuation emerging from the processing pipeline 36 is the instruction pointer value specified as an operand in the jump instruction and the current frame pointer. For a conditional jump instruction, a location specified as an operand in the instruction is tested for some condition, and, depending on the outcome, one of two possible continuations emerges out of the processing pipeline 36. It contains either the current instruction pointer plus 1 or a new instruction pointer specified as an operand in the instruction. In either case, it contains the current frame pointer.

The frames are typically stored, as previously noted, in a frames portion 24 of local processing element memory. A difficulty arises, however, when data values held in a frame need to be shared by more than one processing element. To overcome this difficulty, the preferred embodiment of the present invention utilizes the global memory available in the heap memory elements 20 (FIG. 1). In particular, shared data values are stored in the global heap memory elements 20. To operate on these shared data values, the processing elements 10 must first bring the data values into local frame storage 24. This can be done using a load instruction. Results of these operations may be returned to the global heap memory elements 20 using a store instruction.

The load and store instructions are the only instructions for moving data in and out of local memory of processing elements 10. They do not perform any arithmetic operations. They move data between frames 24 of local memory and heap memory elements 20.

Figure 5:
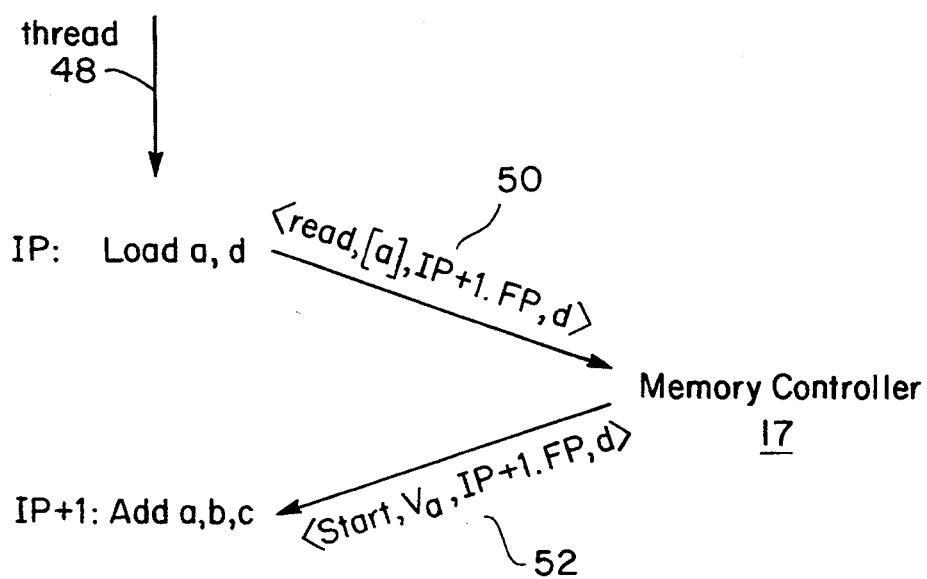
FIG. 5 illustrates the operation of a load instruction.

FIG. 5 shows the load instruction in more detail. For illustrative purposes, suppose that the processing element 10 is executing a given thread of computation 48. Included within this thread 48 is a local instruction to which the instruction pointer (IP) points. When the load instruction is placed into the processing pipeline 36, the processing element 10 attempts to execute it. The instruction specified in FIG. 5 tells the processing element to load a value held in a heap memory element 20 location to a memory location held within a local frame 24. In the operand fetch stage 30 of the processing pipeline 36, the processing element 10 looks for the heap memory location address by looking at the memory location specified by the frame pointer plus a. That location contains a pointer to a specific heap memory element 20 location. Processing then continues outside the pipeline 36 at the load or store component 38 of the processing element 10. This component generates a message 50 that is sent through the network 14 to the heap memory elements 20.

The message 50 is comprised of several fields. Specifically, a first field tells the memory controller 17 that a read is desired of the heap memory element 20 location specified in the second field of the message 50. This second field includes the address taken from the frame as previously discussed. In the example case of FIG. 5, the pointer was held at frame pointer plus a. The third field of the message specifies a continuation which is a thread to be initiated after the read value has been loaded. The fourth and final field denoted as "d" specifies the offset of the memory location within the frame 24 where the read value is to be loaded.

The memory controller 17 of the heap memory element responds to this message by sending a response message to the processing element 10. The response message 52 is also comprised of several fields. In particular, the first field specifies that this is a start message. The second field is the value taken from address [a] of the heap memory to be loaded into the memory location at frame pointer plus d in the processing element 10. The third field is the continuation that was passed in the request message 50. The fourth field is the offset field which also was sent in the request message 50.

When the processing element 10 receives this message 52, it does two things. First, it loads the value read from heap memory element 20 to the memory location specified by the frame pointer plus the offset. In FIG. 5 the value $V_a$ is loaded into the memory location pointed to by the frame pointer plus d. Second, it forwards the thread descriptor specified in the third field of the response message 52 to the token queue 22.

Figure 6:
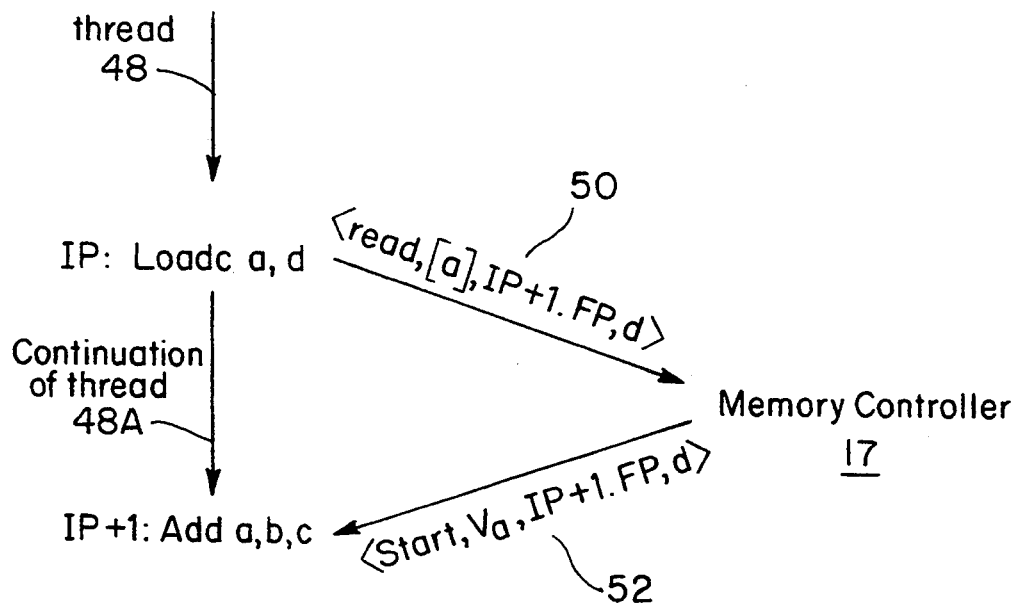
FIG. 6 illustrates the operation of a load and continue instruction.

An interesting feature of the load instruction is that it terminates the current thread in which it is contained (i.e. no continuation is issued). A special load and continue instruction is included to allow the thread to continue operating after the load instruction is performed. The operation of the load and continue instruction (denoted as loadc) is illustrated in FIG. 6. It generates the same request message 50 as the load instruction, and the memory controller 17 responds with the same response message 52. The loadc instruction differs from the load instruction in two ways. First, the instruction pointer in the request that is sent to memory is not the current instruction pointer plus 1 but a different instruction pointer (designated as IP$_v$ in FIG. 6) that is an operand of the loadc instruction. Second, instead of issuing no continuation, it issues a continuation designated as the current instruction pointer plus 1 and the current frame pointer. As such, the loadc instruction allows a continuation of the thread such as 48A shown in FIG. 6.

The load and loadc instructions defer the task of retrieving the heap memory element data to the memory controller 17. By doing this, they overcome the delay that usually occurs waiting for access to memory. In typical data processing systems (both sequential and parallel), the processor must wait during the time period in which memory is accessed. The waiting time period is usually quite large relative to the time required to perform other processor operations. This memory latency is overcome with the load and loadc instructions by not requiring a processor to idle while memory is being accessed. After deferring the task of accessing memory, the processor takes another continuation from the token queue 22 to process so that it does not idle. The load instruction thereby allows the processor to switch to another thread of computation if it would idle otherwise. The token queue 22 assures that another thread will generally be available and thus, facilitates maximum use of the processor despite memory latency.

There is no requirement of a temporal correlation between the request for a read from the heap memory elements 20 and a response generated from the request. Rather, loads can be considered as split-phase transactions comprised of a request phase and a response phase. Performing the loads in this manner enables the preferred embodiment of the present invention to issue multiple load requests before receiving any response to a particular one of these requests. Moreover, responses can be generated in an order different from the order in which requests are made. A continuation for the thread to which the response is targeted is specified in the response message 52.

Figure 7:
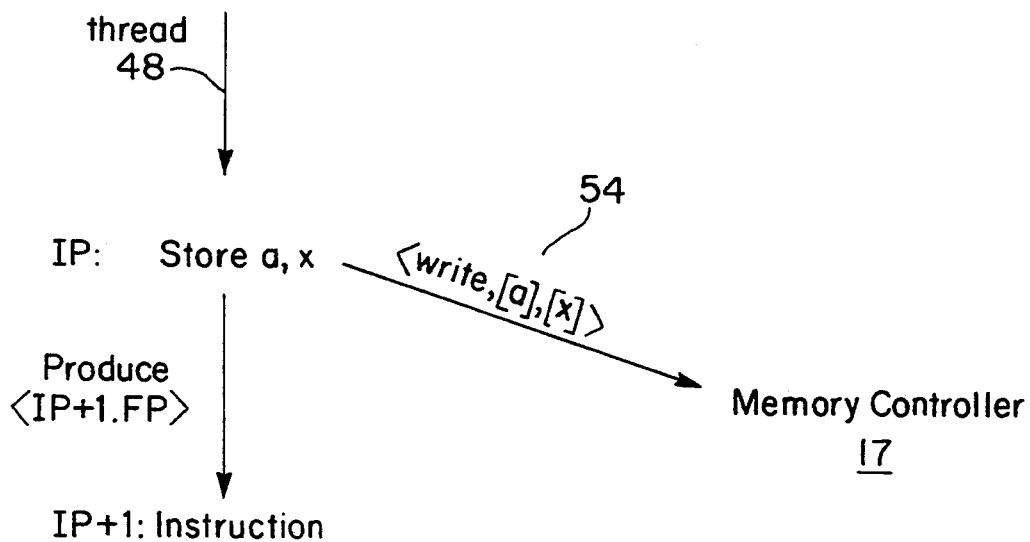
FIG. 7 illustrates the operation of a store instruction.

A store instruction is similar to a load instruction except that the data held in the local frame of memory 24 is written into the heap memory element location 20. FIG. 7 illustrates a sample operation of a store instruction. The store instruction has two operands. The first operand "a" specifies an address in local memory where a value to be stored is held, and the second operand "x" specifies an address in local memory that contains the heap memory element address where the value is to be stored. In the example of FIG. 7, the value is stored at the local memory address specified by the frame pointer plus a. The heap memory location address is stored at a local memory address specified by the frame pointer plus x. Once the specified value and heap memory element address are found, the processing element issues a request message 54 to the memory controller 17.

The request message 54 specifies that a write is requested. It notes the heap memory element address where write will take place and the value to be stored there. In response to this message, the memory controller 17 writes the value into the heap memory element address. The processing element 10, after issuing this message 54, issues a continuation designated by the instruction pointer plus one and the frame pointer. No response message is generated.

Figure 8:
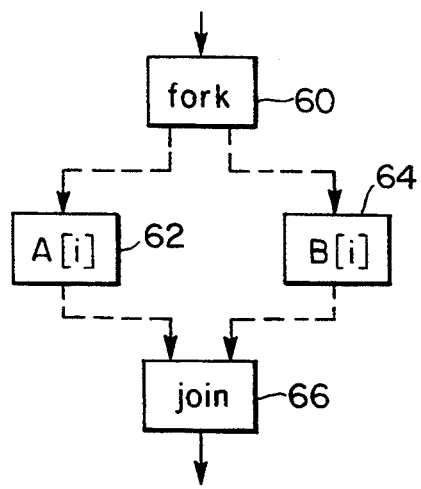
FIG. 8 illustrates the effect of both a fork instruction and a join instruction.

New control instructions in the present invention are the fork, join and start instructions which control operation of the processing system. A fork instruction produces two continuations from a current operating thread. One continuation is the next instruction in the thread in which the fork instruction is executed. The other continuation represents an entirely different thread that operates on the same frame. Hence, if the boxes shown in FIG. 8 represent instructions associated with certain threads of computation, when a fork 60 occurs, the continuation is not a straight path as would be found absent the fork. Instead, two concurrent thread descriptors are passed to the token queue 22. The first thread descriptor is associated with A[i] 62 which contains the next instruction to be executed in the current thread. The other thread descriptor is associated with B[i] 64 which contains an instruction of an entirely different thread of computation.

The fork instruction thus provides an ability to initiate a new thread that can execute concurrently with the current thread. Any synchronization that needs to be achieved between the threads can be instituted using a join instruction.

The join instruction (66 in FIG. 8) performs the opposite operation of the fork instruction. It causes two independently running threads of computation to produce only a single continuation. In other words, it takes two threads and produces a single thread from it.

Figure 9:
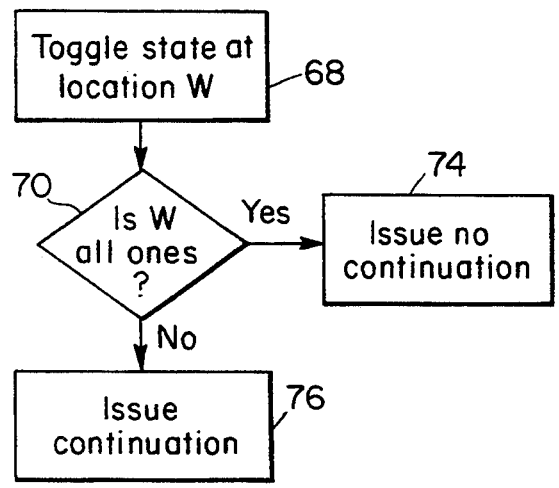
FIG. 9 illustrates a flow chart of the steps performed in a join instruction.

FIG. 9 shows a flow chart of how the join operation joins together two threads. The syntax of the join operation is "join w", where w specifies a memory location. The single join instruction must be executed by both threads in order for a join to occur. The join instruction acts on the specified memory location w which is marked as either all ones or all zeroes. When the join instruction is executed, the value at location w is toggled to the other state of ones or zeroes that is opposite the current state (Step 68). Thus, for instance, if w were all ones, it would be switched to all zeroes and vice versa. If a thread is the first thread to execute the join instruction for memory location w, the memory location w is marked as all ones. The system then looks to see if the memory location is marked all ones (Step 70). If the memory location is already all ones, the thread that caused it to be marked all ones issues no continuation (Step 74).

On the other hand, if the thread is not the first thread to execute the join instruction but is instead the second thread to execute the join instruction, then, the memory location w is marked all zeroes, and a continuation issues so that the processing of a new thread is initiated beginning at the next instruction (Step 76). Hence, the rule of the join operation is that both threads terminate and a new thread is initiated after the arrival of the second one.

Figure 10:
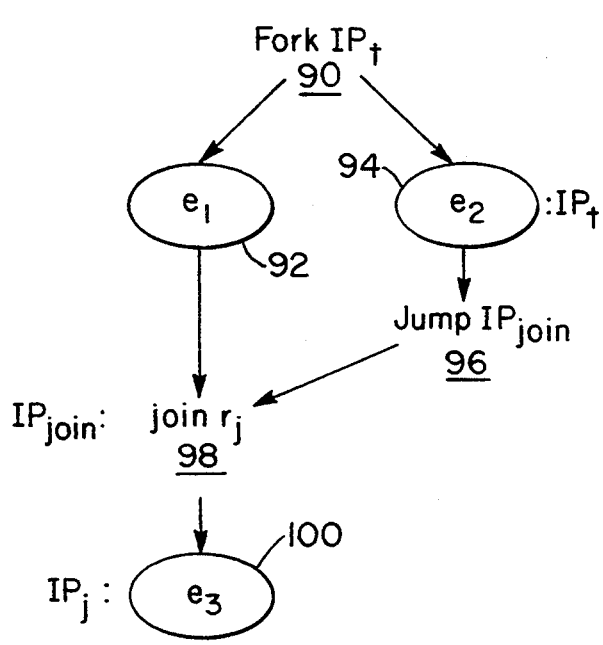
FIG. 10 illustrates a sample program using a fork instruction and a join instruction.

FIG. 10 shows an example of a program where fork instructions and join instructions are used. In particular, presume the instruction pointer starts off with a value of IP. At instruction 90, a fork to IP$_f$ is performed. Thus, expressions e1 and e2 will subsequently be performed independently in two separate threads that share the same frame pointer. The thread having an instruction pointer value of IP$_f$ next executes a jump to the instruction specified by IP$_{join}$. The second thread accordingly next executes the instruction specified by IP$_{join}$.

The other thread which executed e1 92 proceeds to perform the instruction at IP$_{join}$. This instruction 98 is a join instruction specifying memory location r$_j$. It does not matter which thread executes the join first. The one that executes it first will issue no continuation. The other will, in contrast, issue a continuation. The thread that issues a continuation specifies e3 as the next instruction 100 to be executed. The join assures that both e1 and e2 have been performed by the two threads respectively prior to e3 being performed.

The start instruction is used to terminate a thread of computation in the current frame and to initiate a new thread of computation in a different frame. A start instruction has three operands v, c and d where v, c and d specify memory locations in the current frame. The location designated by c contains a new continuation, that is, a new frame pointer and a new instruction pointer. The location designated by d specifies an offset in the frame designated by the new frame pointer. The new continuation may be on a different data processing element or it may be on the same one.

Figure 12:
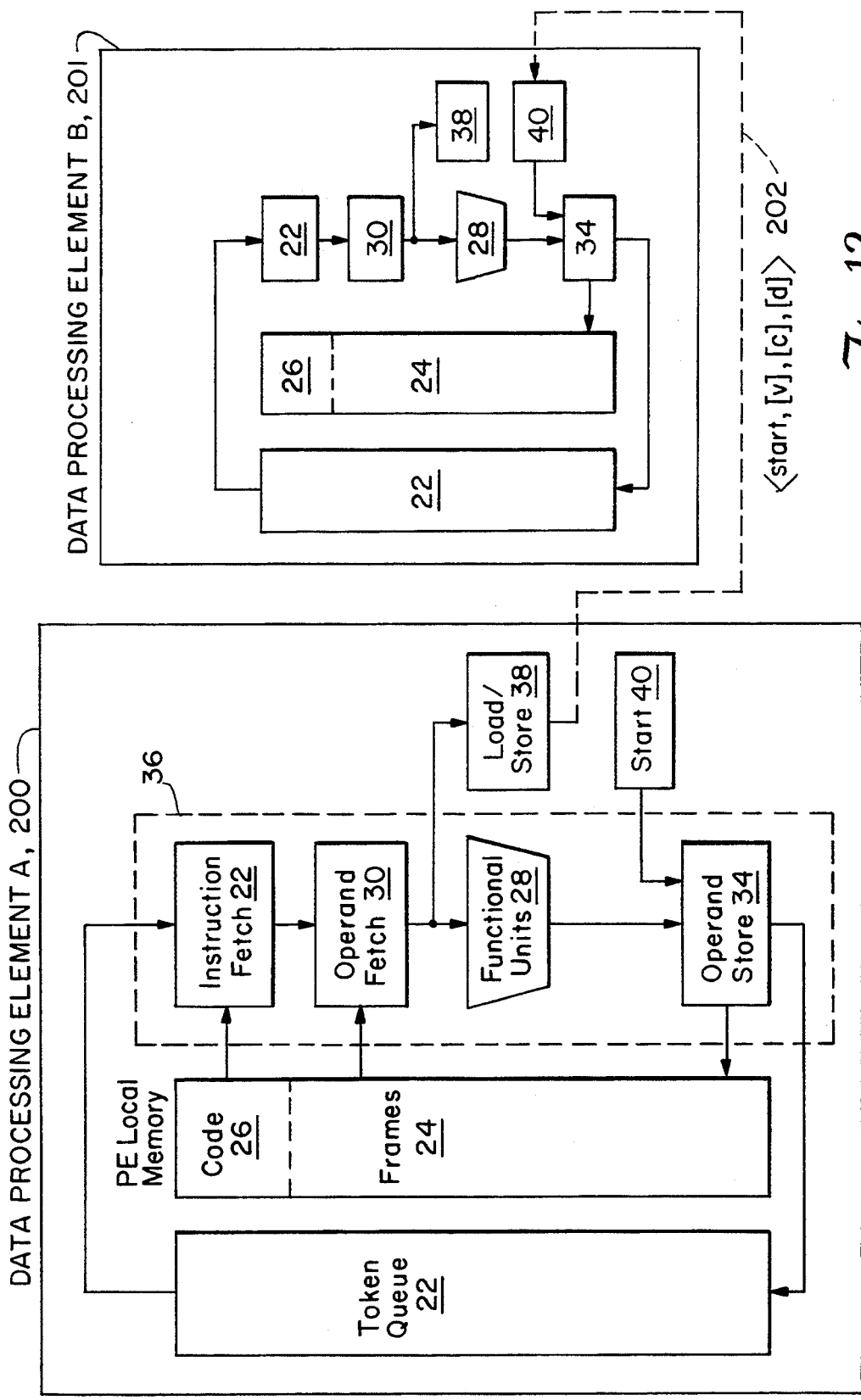
FIG. 12 illustrates the operation of a start instruction.

FIG. 12 shows the execution of the start instruction in more detail. For illustrative purposes, suppose that a start instruction "start v c d" is placed in the processing pipeline 36 of data processing element A 200. In the operand fetch stage 38, the three operands [v], [c] and [d] are read from the current frame. Processing then continues in the load/store component 38. Here, a message 202 is generated and sent to data processing element B 201. The format of the message 202 is "<start,[v],[c],[d]>". The format of the message is identical to the format of the previously described response messages 52 from a memory controller to a data processing element. Data processing element A 200 may continue to perform instructions from other threads taken from its thread descriptor storage 22.

When the message arrives at the store component 40 of data processing element B 201, it is treated in exactly the same way as the previously described response messages 52 from a memory controller. In data processing element B 201, the value [v] is stored at offset [d] in the frame specified in the continuation [c], and the continuation [c] is placed in the token queue 22. As usual, data processing element B 201 may then execute instructions from the thread designated by the continuation [c].

The start instruction provides a way to simultaneously do two things: deliver a data value from one data processing element (A) to another (B), and initiate a thread of computation in B.

The present invention can also be used in a producer/consumer environment. In that case it may be desirable to implement the heap memory elements as I-structures. The I-structure organization of the heap memory elements 20 prevents potential conflicts for memory locations that could occur otherwise. When the heap memory elements 20 are organized as such, two new types of messages are desirable for the load and store instructions, respectively.

Instead of merely sending a read request when loading, an I-read request is sent. The I-read behaves like an ordinary read in most respects. However, if the value sought is not available, the memory controller 17 stores the request message in the heap memory element 20 location where the value is supposed to be. If other read requests arrive while the value is still not available, messages indicating such requests are placed on a deferred list pointed to by the heap memory element 20 location. Once the value arrives, the memory controller 17 stores the value in the heap memory element 20 location, removes the message and generates a response message containing the value and continuation to the appropriate processing element 10.

Similarly, instead of merely sending a write request when storing data, an I-write request is sent. As in a write request, the data value is stored by the memory controller 17 in the designated heap memory element 20 location. In addition, if that location contains a deferred list of read requests, then the memory controller 17 also sends response messages for all those read requests.

Figure 11:
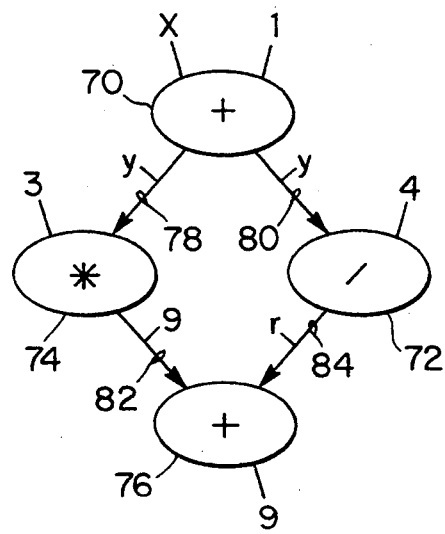
FIG. 11 illustrates a sample data flow diagram.

An advantage of the preferred embodiment of the present invention is that it can execute data flow graphs. FIG. 11 shows a sample data flow graph which the present invention can execute. The data flow graph shown in FIG. 11 corresponds to the equation $(x+1) \times 3 + (x+1)/4$. The instruction performed at node 110 is implemented using an add instruction. The syntax of that instruction is add x,1,y. It adds $x+1$ and store it at location y. Once the add is performed, a fork instruction is performed. This causes the computation to fork into the two branches 78 and 80 shown in FIG. 11.

The computations performed at node 112 and 114 are performed concurrently. In particular, the computation performed at node 114 is performed as a continuation of the same thread in which the fork instruction was executed. An instruction to multiply y and 3 and store it in a location performs the task by node 114. In a separate thread, an instruction to divide the value held in location y by 4 and to store the resulting produce in a register r performs the operation specified by node 112. Returning to the first thread, an instruction to join at location j is executed after the multiplication instruction. Similarly, in the second thread the instruction to join location j is performed. Presuming that the second thread completes its calculation after the first thread, it initiates the thread that performs the adding operation specified by node 116 of adding the values held at location a and location r and storing them in a location queue. The first thread, in contrast, halts operation after executing the join, without initiating any thread.

As the above example shows, the preferred embodiment of the present invention can adequately execute data flow graphs. It is, thus, a sort of hybrid which executes data flow graphs on a Von Neumann architecture. Moreover it can execute these data flow graphs independently and in parallel. The reduced instruction set nature of the processing element further heightens performance by allowing computations to be formed quickly with non-complex architectural hardware. Further, the unique nature of the loading instructions prevents wasted processor idle time attributable to memory latency. A particularly attractive aspect of the present invention is that, since its instruction set is a proper extension of the instruction set of a conventional reduced instruction set processor, compatibility with existing software can be maintained.

While the invention has been particularly shown and described with reference to preferred embodiments thereof, it will be understood by those skilled in the art that various changes in form and detail may be made without departing from the spirit and scope of the invention as defined in the appended claims.

We claim:

1. A data processing system comprising:
plural processing elements, each having a thread descriptor storage, for imperative processing of each of plural threads of computation in response to thread descriptors from the thread descriptor storage, each of said thread descriptors identifying a next instruction to be processed in one of said plural threads of computation and a frame of storage locations on which the next instruction is to operate;

a memory for storing data and instructions for the plural processing elements in executing the plural threads of computation;

a memory controller for controlling the memory, the controller responding to request messages from respective ones of the plural processing elements for memory access to the memory by returning a response message to the respective one of said processing elements, the response message including requested data and also including one of said thread descriptors;

wherein each of the plural processing elements responds to a load instruction to retrieve data from the memory by generating one of said request messages comprised of a thread descriptor that is not retained by said processing element and by transmitting said request message to the memory controller which, in turn, generates a response message that includes the thread descriptor of the request message and the requested data, said processing element processing the response message by storing the requested data in the frame identified in the thread descriptor, said processing element storing the thread descriptor of the response message in said thread descriptor storage only upon the storing of all data required for processing of the next instruction identified by the thread descriptor, such that the storing of the thread descriptors in the thread descriptor storage and resultant imperative processing of the plural threads of computation are independently performed by the plural processing elements.

2. A data processing system as recited in claim 1 wherein the processing elements execute forking instructions that generate two threads of computation from a single thread of computation and execute joining instructions that merge multiple threads of computation into a single thread of computation.

3. A data processing system as recited in claim 1 wherein the threaded descriptor storage is a FIFO queue.

4. A data processing system as recited in claim 1 wherein each of the plural processing elements begins processing a next thread in the thread descriptor storage if continuing processing of a current thread would cause the processing element to idle.

5. A data processing system as recited in claim 1 wherein each of the plural processing elements is a reduced instruction set processing element.

6. A data processing system as claimed in claim 1 wherein each of the plural processing elements responds to the response message by storing data from the response message at a memory location identified in the response message and stores the thread descriptor in said thread descriptor storage without the data.

7. A data processing system as claimed in claim 1 wherein each of the plural processing elements processes a join instruction by incrementing a value stored in a memory location and determining from said value whether a continuation to a next instruction is to issue.

8. In a multithreaded data processing system having a processing element for imperative processing of plural threads of computation, a method for executing load instructions by the processing element to load data from a global memory location of global memory to a local memory location of local memory, the local memory being local to the processing element, the method comprising, for each of said load instructions, the steps of:

a) generating a request message from the processing element to a memory controller to read the data held at the global memory location, the request message including a thread descriptor identifying a next operation in one of said plural threads of computation to be processed and an identification of the local memory location;

b) generating a response message to respond to the request message using the memory controller wherein the response message comprises the data from the global memory location, the thread descriptor of the request message, and the identification of the local memory location, such that the response message is generated independent of current activity of the processing element; and c) from the response message loading the data from the global memory into the local memory location and storing the thread descriptor of the response message in said thread descriptor storage only upon the storing of all data required for processing of the next operation identified by the thread descriptor, such that the storing of the thread descriptors in the thread descriptor storage and resultant imperative processing of the plural threads of computation are independently performed by the processing element.

9. A method as recited in claim 8 wherein multiple request messages generated for distinct load instructions are sent before a single corresponding response message is returned.

10. A method as recited in claim 8 wherein a response message for a second load instruction is returned prior to a response message for a first load instruction.

11. A data processing system comprising:

at least one processing element for imperative processing, in response to thread descriptors from a thread descriptor storage, of individual imperative control flow instructions of each of plural threads of computation;

a working memory, coupled to said at least one processing element, comprising frames of memory on which the at least one processing element operates in processing instructions;

said thread descriptor storage, coupled to said at least one processing element, for storing a plurality of thread descriptors each of which identifies a next instruction to be processed in one of said plural threads of computation and identifies one of said frames of memory for processing by the at least one processing element;

said at least one processing element matching operands required for processing of said next instruction and storing said operands in the frame of memory identified by the thread descriptor, said at least one processing element storing the thread descriptor in said thread descriptor storage only upon the storing of all operands required for processing of said next instruction identified by the thread descriptor, such that said storing of the thread descriptors in said thread descriptor storage and resultant imperative processing of the individual imperative control flow instructions are independently performed by said at least one processing element.

12. A data processing system as recited in claim 11 wherein the thread descriptors are comprised of two parts: a frame pointer that identifies the frame of storage elements residing in local memory to be transferred to working memory for processing by the processing element and an instruction pointer which identifies an instruction which operates on multiple memory locations.

13. A data processing system as recited in claim 12 wherein memory space allocated for the frames of storage elements is not fixed a priori at a fixed size.

14. A data processing system as recited in claim 11 wherein the working memory comprises a cache.

15. A data processing system as recited in claim 11 wherein the at least one processing element comprises a plurality of processing elements that process in parallel.

16. A data processing system as recited in claim 11 wherein the at least one processing element is a reduced instruction set processing element.

17. A data processing system as recited in claim 11 wherein the processing element comprises a pipeline such that each stage of the pipeline may operate on separate threads of computation.

18. A data processing system as recited in claim 17 further comprising a clocking means that clocks thread descriptors out of the thread descriptor storage into the pipeline so that the processing element may act on the thread specified by the thread descriptor.

19. A data processing system as recited in claim 17 wherein the clocking means also clocks successive stages of the pipeline to shift data from one stage of the pipeline to a next stage of the pipeline.

* * * * *